March 25, 1969     R. B. BARBER     3,434,345
OSCILLATING PISTON-TYPE FLOW METER
Filed Dec. 8, 1966
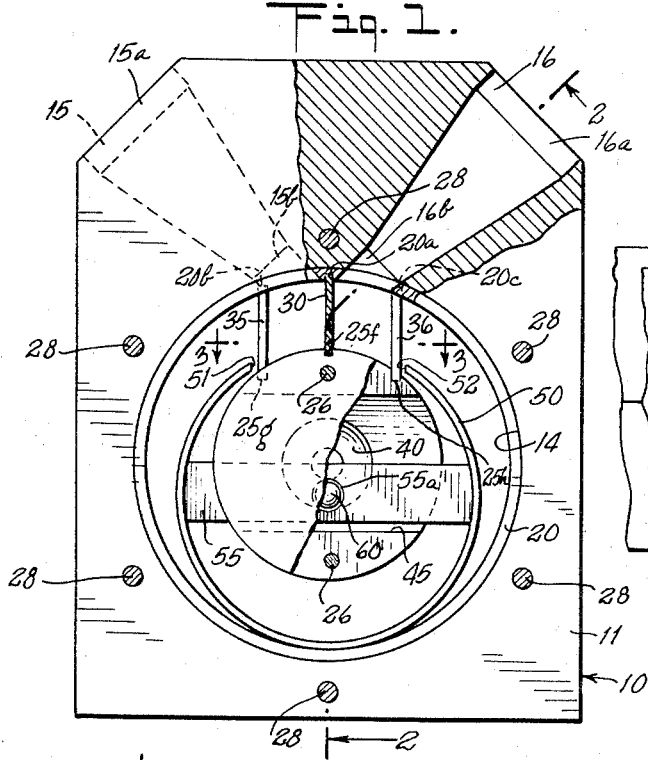
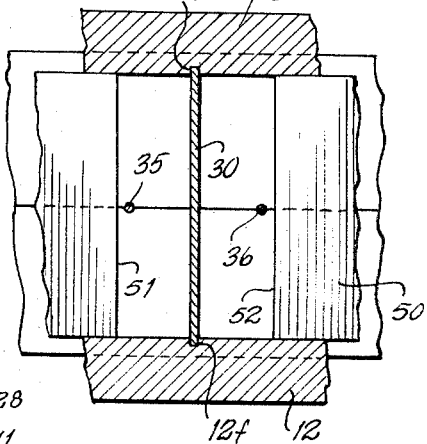
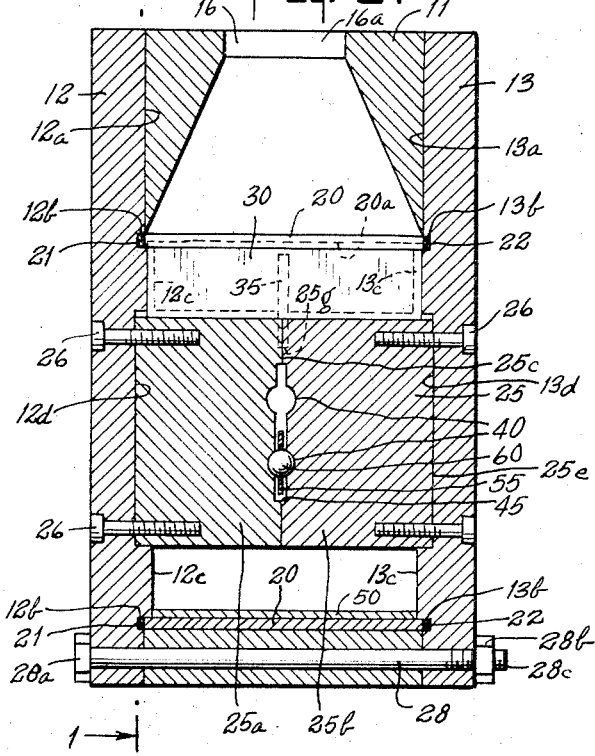
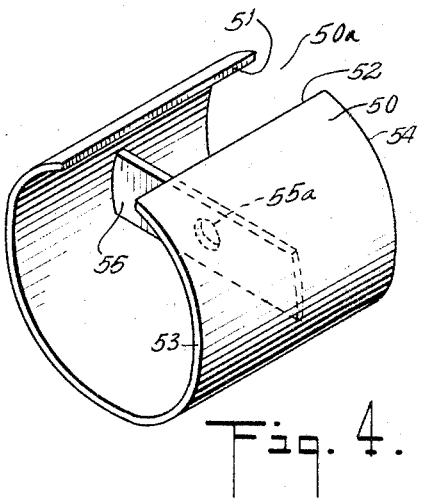
INVENTOR.
RONALD B. BARBER
BY Lester W. Clark
ATTORNEY

United States Patent Office 3,434,345
Patented Mar. 25, 1969

3,434,345
OSCILLATING PISTON-TYPE FLOW METER
Ronald B. Barber, Cheshire, Conn., assignor to Neptune Meter Company, a corporation of New Jersey
Filed Dec. 8, 1966, Ser. No. 600,173
Int. Cl. G01f 3/08
U.S. Cl. 73—257                    4 Claims

ABSTRACT OF THE DISCLOSURE

Oscillating piston-type flow meter including guides at opposite sides of adjacent ports to prevent piston from varying effective port area. Piston is guided by diametrical web extending through slot in hub, and by ball carried by web and moving in annular race in hub. Hub is formed by two half-hub members mounted on end plates and permitting ready disassembly of meter.

---

This invention relates to meters, and more particularly relates to improvements in fluid flow metering devices of the oscillating piston type.

Oscillating piston meters comprise an open cylindrical piston enclosed within a cylindrical measuring chamber having a greater diameter than the diameter of the piston. The piston is free to rotate eccentrically so that as it rotates a first moving seal is formed where the piston's outer periphery contacts the inner periphery of the chamber, and a second moving seal is formed where the piston's inner periphery contacts the outer periphery of a centrally located hub. In such a meter, the fluid enters at an inlet side of the piston to push it around, and in so doing, forces the fluid on the outlet side of the piston out of the chamber. The inlet and outlet ports are divided by a flow division member, and the piston is slotted to straddle and oscillate upon the flow division member. In actual practice, the pressure drop, accuracy, and life characteristics of such meters are less than completely satisfactory.

The pressure drop of the meter varies appreciably with time during a piston cycle, primarily because the time rate of change of the volume on the outlet side of the piston is not constant and the effective port area on the outlet side does not vary inversely to compensate for this fact. In fact, in prior art constructions the effective outlet port area is varied in such a way as to increase the tendency toward variation in pressure drop during the piston cycle.

Moreover, piston speed variation occurs during the piston cycle because the piston walls have a finite thickness and a web is provided across the piston which also has a finite thickness, the volumes occupied by the walls and web subtracting from the fluid volume which is actually passed from the inlet to the outlet port during a piston cycle. The speed variation is usually in the order of ±10%, and is detrimental in that it contributes additional variation in pressure drop, and further in that the higher acceleration and deceleration forces which are produced cause excessive wear which shortens the life of the meter.

It is an object of the present invention to provide an improved meter of the type described.

Another object of the invention is to provide such a meter wherein pressure drop variation during the piston cycle is attenuated, and the average pressure drop is lowered.

Another object of the invention is to provide such a meter wherein the effective inlet and outlet port areas remain invariant during the piston cycle thereby eliminating that aspect of pressure drop variation attributable to effective port area variation.

Another object of the invention is to provide a rotating eccentric piston meter of improved accuracy and life span.

Another object of the invention is to provide such a meter wherein piston speed variation during the piston cycle is attenuated, thereby decreasing pressure drop variation and acceleration and deceleration forces, so as to reduce wear and diminishment of life span of the meter.

These and other objects and advantages of the invention will be more fully understood as a detailed description of a presently preferred but merely illustrative embodiment of the inventive principles is hereinafter set forth with reference to the drawings, wherein:

FIG. 1 is an elevational section view of a meter according to the invention taken along plane 1—1 of the apparatus shown in FIG. 2, partially broken away to show one of the ports;

FIG. 2 is a vertical section view of the apparatus shown in FIG. 1 taken along plane 2—2 therein showing internal details of construction;

FIG. 3 is a partial section view taken along plane 3—3 of FIG. 1 of the apparatus shown in FIG. 1 taken along plane 3—3 therein; and FIG. 4 is a perspective view of the piston shown in FIGS. 1–3.

Briefly, the invention provides invariant inlet and outlet effective port areas by modifying the piston to include spaced circumferential ends defining a relatively large circumferential gap. The circumferential end portions are guided for piston stroke motion by a pair of guides spaced on either side of the flow division member. The space between the guides is thereby free of piston intrusion, and the portion thereof on one side of the flow division member includes the inlet port while the portion on the other side includes the outlet port. The major contribution of inverse effective port area variation to pressure drop variation is thereby eliminated. Further, the piston itself is fabricated of thin stock and is provided with a narrow diametric web to provide the eccentric pivoting, thus reducing piston speed variation and thereby attenuating a further contribution to pressure drop variation and reducing acceleration and deceleration forces which cause wear and reduction of the life span of the piston meter parts.

Referring now to the figures, there is shown in FIGS. 1 and 2 a meter indicated generally at 10 comprising a housing 11 having a cylindrical opening 14 extending therethrough to define a piston chamber, which is closed at either end by generally plate-shaped housing covers 12, 13. A pair of ports 15, 16 are symmetrically disposed at the upper end of housing 11 on either side of a vertical diametric plane of symmetry through cylindrical opening 14. Ports 15, 16 communicate between the interior of cylindrical opening 14 and the exterior space outside of meter 10, and may be provided with threaded portions 15a, 16a for connection to conduits leading fluid into and out of meter 10.

Plates 12, 13 are not planar in their respective faces 12a, 13a communicating with the housing 11, but rather include an annular groove 12b, 13b having an outside diameter equal to the outside diameter of cylindrical opening 14, an annular boss 12c, 13c concentric with and on a smaller diameter than annular groove 12b, 13b, and a cylindrical depression 12d, 13d concentric with and ringed by annular bosses 12c, 13c. Cylindrical depressions 12d, 13d, annular grooves 12b, 13b, and annular bosses 12c, 13c are thus all concentric with cylindrical opening 14 when the covers 12, 13 are assembled with the housing 11.

A cylindrical insert 20 is provided within cylindrical opening 14, and has an outer diameter equal to the diameter of cylindrical opening 14, a thickness equal to the width of annular grooves 12b, 13b, and a longitudinal dimension sufficient so that its ends occupy grooves 12b, 13b when the parts are assembled as illustrated. Cylindrical insert 20 provides a replaceable member adapted to receive the wear occasioned by the motion of the piston, and additionally can be chosen to afford better wear and lubricity properties than might be obtainable with the material most advantageously employed in the fabrication of housing 11 itself. An O-ring 21, 22 is carried respectively within annular grooves 12b, 13b to seal cylindrical insert 20 therein against fluid leakage thereat.

A cylindrical hub 25 is mounted coaxially within cylindrical opening 14, to form a center member means concentric with insert 20. Cylindrical hub 25 comprises a pair of sub-cylinders 25a, 25b, each of which is of equal longitudinal dimension, so that the common end surface 25c where the two sub-cylinders 25a, 25b abut endwise is located midway between the extreme faces 25d, 25e of cylindrical hub 25. Cylindrical hub 25 has a diameter which is determined by the length of stroke desired in meter 10. In the illustrated embodiment hub 25 has a diameter which is approximately two-thirds the inner diameter of cylindrical insert 20, which inner diameter forms the effective inner periphery surface of the meter chamber. As is brought out in my copending application, entitled "Meter," filed on Dec. 8, 1966, Ser. No. 600,167, the ratio of piston stroke length to piston diameter is usually about 0.3, but is desirably increased toward 1.0 to reduce pressure drop and leakage. While the illustrative embodiments of the present invention show the usual prior art ratio of about 0.3, the teachings of the aforesaid copending application can be employed in a meter also constructed in accordance with the present invention, i.e. the two are compatible.

The cylindrical hub 25 has a longitudinal dimension which is equal to the distance between cylindrical depressions 12d, 13d of covers 12, 13 when the latter are assembled in place with housing 11, so that communication with both covers is afforded. A pair of bolts 26 are passed through cover 12 for threaded engagement at upper and lower portions of sub-cylinder 25a to ensure surface contact therebetween, and another pair of bolts 26 are provided to secure the same relatoinship between cover 13 and sub-cylinder 25b. The meter 10 is held together by six bolts 28 (FIG. 1) arranged in spaced relationship around housing 11 just outside of cylindrical opening 14 therein, which hold covers 12, 13 on housing 11. One of bolts 28 may be seen in profile in FIG. 2 to pass completely through housing 11 and covers 12, 13 and to be anchored to cover 12 by a bolt head 28a and to cover 13 by a nut 28b threadedly secured to a threaded end 28c of bolt 28. When bolts 28 are removed to take off covers 12, 13, the sub-cylinders 25a, 25b part at surface 25c to come out with the respective covers.

Along the upper extreme of cylindrical hub 25 there is a longitudinal groove 25f (FIG. 1) which underlies a corresponding groove 20a (FIG. 1) in cylindrical insert 20. As is best seen in FIG. 3, each of covers 12, 13 have vertical grooves 12f, 13f respectively, in annular bosses 12c, 13c respectively at the uppermost portions thereof. All of these grooves lie within the aforesaid vertical plane of symmetry of cylindrical opening 14. The four grooves 20a, 25f, 12c, 13c may be seen in FIG. 2 to provide a rectangular groove frame when the covers 12, 13 are assembled to the housing 11. Carried within this groove frame is a rectangular flow division member 30 for the usual purpose of completely separating one port 15 from the other port 16. Member 30 is conveniently formed as a diaphragm, as illustrated. Although the meter is reversible, and either can serve as the inlet or the outlet port, the port 15 will be designated as the inlet port and the port 16 will be designated as the outlet port for convenience of description.

Inlet and outlet ports 15, 16 provide a relatively constant cross-sectional area extending from their threaded outer limits 15a, 16a to their inner throats 15b, 16b respectively. Ports 15, 16 are rectangular in cross-section, and in one cross-sectional dimension taper inwardly to throats 15b, 16b (FIG. 1) while in the other dimension they taper outwardly to throats 15b, 16b (FIG. 2). The increase in one dimension is offset by the decrease in the other so that the cross-sectional area is relatively constant throughout. In addition, a relatively narrow throat is thus presented to intrude upon the periphery of cylindrical insert 20, while at the same time the entire longitudinal dimension of cylindrical insert 20 is opened to the throats.

A pair of piston guides 35, 36 are provided at either side of diaphragm 30, parallel thereto, and adjacent to the throats 15b, 16b of ports 15, 16. Piston guides 35, 36 comprise cylindrical pins which at their upper ends are carried within cylindrical depressions 20b, 20c respectively in cylindrical insert 20, and which at their lower ends are carried within cylindrical depressions 25g, 25h in cylindrical hub 25. As may be seen in FIG. 2, cylindrical depressions 25g, 25h are divided vertically into two parts, one part being in sub-cylinder 25a and the other part being in sub-cylinder 25b, so that when either of the sub-cylinders is removed, the pin 35, 36 is not disturbed. Guides 35, 36 can be in many forms other than pins. In some forms it may be more convenient to mount guides 35, 36 in slots or the like in plates 12, 13 rather than as shown.

The interface 25c between sub-cylinders 25a, 25b of cylindrical hub 25 is formed so that the facing surfaces of the two sub-cylinders mutually define a toroidal ball race 40. Also, the faces define a horizontal slot 45 extending completely through cylindrical hub 25 from left to right thereof as viewed in FIG. 1. Slot 45 intersects the entire periphery of race 40 at the median plane therethrough, and has a height sufficient to accommodate the web 55 throughout its rocking and rotating motion during a cyclical movement of piston 50.

A piston 50, shown in perspective in FIG. 4, comprises a relatively thin generally cylindrical member including a completely open gap indicated at 50a at the upper portion thereof between opposed cylindrical peripheral ends 51, 52. A web 55 extends lengthwise diametrically across piston 50 midway between the ends 53, 54 thereof, and has a width comprising a small fraction of the diameter of piston 50, and a thickness reduced as much as possible consistent with the necessity of bracing piston 50 and carrying the necessary stresses. A circular aperture 55a appears in web 55 concentric with the center of piston 50. When the parts are assembled as shown in FIGS. 1 and 2, piston 50 embraces cylindrical hub 25 up to guides 35, 36, and web 55 is slidably captured within slot 45 in cylindrical hub 25. A ball bearing 60 is rotatably held within aperture 55a of web 55 for movement within race 40. By this expedient, piston 50 may be moved eccentrically within cylindrical insert 20 as ball 60 rolls around race 40 carrying web 55 and piston 50 with it.

The piston 50 is shown in FIG. 1 in its lowermost position. As will be appreciated, it is driven in continuously repeating cycles around cylindrical insert 20 by the inflow through port 15. At all points there will be an outer fluid seal between piston 50 and insert 20, and an inner fluid seal between piston 50 and hub 25, all as is well known. However, during each cycle, when piston peripheral ends 51, 52 rise and fall during each piston stroke, in no case will piston 50 intrude upon or cover the port throats 15b, 16b, as occurred in prior art constructions. The effective port areas are thereby rendered invariant with piston position, and pressure drop variation is accordingly reduced.

Additionally, the reduced volume occupied by the narrow web 55 and the thin walled piston 50 insure greater meter accuracy, and reduce piston speed variation thereby also reducing pressure drop variation and increasing life span of the parts for the reasons already explained.

The parts can be fully exposed by removing one of the covers 12, 13. This will remove one of the sub-cylinders 25a, 25b thus exposing the ball 60 for removal, and exposing the piston 50 for removal, both by virtue of the fact that race 40 and slot 45 are formed at the interface of the two sub-cylinders 25a, 25b. Similarly, the diaphragm 30 can be removed, as can be the pin guides 35, 36, when one of the covers is removed with its sub-cylinder. This gives an easy and convenient means for access to the internal parts, without necessarily removing the meter 10 from any conduit to which it may be attached. Of course in this latter case fluid flow would have to be terminated by outside means before this could be conveniently done.

The meter 10 can also be operated as a pump. In either case, external connection can be made at ball 60, by any of the known expedients, to registration means in the case of use as a meter or to motive means in the case of use as a pump. For example, ball 60 can be rotatably captured within a crank (not shown) carried within slot 45, to turn a shaft (not shown) coaxial with the center of revolution of ball 60. Other expedients may be employed to link the rotation of piston 50 to registration means or motive means.

The invention has been described with reference to a presently preferred, but merely illustrative embodiment. Many variations in form and arrangement of parts may be made without departing from the essential teachings of the invention.

What is claimed is:
1. A fluid meter of the oscillating piston type, comprising:
    (a) means defining a measuring chamber having adjacent inlet and outlet ports, said means including a peripheral cylindrical wall of substantial axial length, end walls, and a cylindrical hub within and concentric with said cylindrical wall, and extending between said end walls;
    (b) a flow division member closing the opening between the end walls, the hub and the cylindrical wall, and located between said inlet and outlet ports;
    (c) a pair of guide means spaced on opposite sides of said adjacent inlet and outlet ports, each said guide means extending between the hub and the cylindrical wall and being axially substantially shorter than the hub and the cylindrical wall, so as not to impede the flow between either port and the measuring chamber;
    (d) an open, generally cylindrical piston partially encircling said hub for oscillation within said chamber, said piston having a peripheral wall defining between its ends a peripheral gap in which are located both said guide members with said inlet and outlet ports therebetween, said guide means being effective to limit the movement of the piston to prevent it from obstructing either port;
    (e) a thin, narrow diametrical web extending across said piston between localities thereof circumferentially spaced substantially 90° from the center line of said gap, said web extending through a diametrical aperture in said hub;
    (f) means in the web at the axis of said piston constrained to move in a circular path around the axis of the hub; and
    (g) means to count the oscillations of the piston.

2. A meter according to claim 1, wherein said peripheral gap is substantially equal in width to the spacing of said guide members so that said piston is arranged for sliding movement on said guide members, and the peripheral wall of said piston can contact the inner periphery of said chamber except between said guide members.

3. A meter according to claim 1, wherein said hub includes a circular race formed in the sides of said diametrical aperture, and said web includes a circular aperture at the axis of said piston, and a ball bearing is captured for rotation within said aperture and within said race.

4. A liquid flow meter of the oscillating piston type, comprising:
    (a) means defining an annular measuring chamber having adjacent inlet and outlet ports, said chamber defining means comprising:
        (1) a central hub;
        (2) a peripheral wall;
        (3) end walls; and
        (4) a diaphragm closing the opening between the end walls, the hub and the cylindrical wall; and
    (b) a piston of hollow generally cylindrical form having a slot extending from end to end along one side, with the diaphragm located in the slot;
    (c) means to count the oscillations of the piston;
wherein the improvement comprises:
    (d) said peripheral wall comprises a housing having a cylindrical aperture extending therethrough;
    (e) said end walls comprise cover plates attached to said housing and closing the ends of said aperture;
    (f) said central hub comprises a pair of half-hubs respectively attached to said end plates and projecting therefrom to the middle of the housing;
    (g) guide means for said piston including:
        (1) a pair of guide elements extending between the hub and the cylindrical wall on opposite sides of the adjacent ports; said guide elements being located between the sides of the slot in the piston and effective to limit the movement of the piston; said guide elements being substantially shorter than the measuring chamber, so as not to impede flow through either port;
        (2) a diametrically extending web extending across said piston and passing through a slot defined by opposed recesses in the inner faces of said half-hubs;
        (3) a ball received in a hole in the center of the web and traveling in an annular path defined by opposed annular grooves in the inner faces of said half-hubs.

References Cited

UNITED STATES PATENTS

| 127,667 | 6/1872 | Winkler | 91—56 |
| 818,566 | 4/1906 | Scotti | 73—255 |

FOREIGN PATENTS

| 363,938 | 5/1906 | France. |
| 490,983 | 8/1938 | Great Britain. |

JAMES J. GILL, *Primary Examiner.*

R. S. SALZMAN, *Assistant Examiner.*